US007198131B2

(12) United States Patent
Tsushima

(10) Patent No.: US 7,198,131 B2
(45) Date of Patent: Apr. 3, 2007

(54) MOUNTING BRACKET

(75) Inventor: Hiromichi Tsushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 179 days.

(21) Appl. No.: 11/003,131

(22) Filed: Dec. 3, 2004

(65) Prior Publication Data

US 2005/0139411 A1 Jun. 30, 2005

(30) Foreign Application Priority Data

Dec. 25, 2003 (JP) ............................ 2003-429205

(51) Int. Cl.
*B62D 21/00* (2006.01)

(52) U.S. Cl. ...................................................... 180/312

(58) Field of Classification Search ................ 180/311, 180/312

See application file for complete search history.

(56) References Cited

U.S. PATENT DOCUMENTS 1,548,078 A * 8/1925 Ward .......................... 280/796
1,593,783 A * 7/1926 Stresau ....................... 280/796
2,319,407 A 5/1943 Knochel et al.
3,925,637 A 12/1975 Becker
5,267,630 A 12/1993 Watanabe et al.

FOREIGN PATENT DOCUMENTS

DE 42 31 213 A1 3/1994
EP 0 188 837 A 7/1986
EP 1 321 219 A1 6/2003
JP 5-97059 4/1993

OTHER PUBLICATIONS

Patent Abstracts of Japan, Jack-Up Part Construction for Side Sill, Publication Date: Sep. 1, 1984.

XP002319860, G. Niemann: "Maschinene lemente Band I Konstruktion und Berechnung von Verbindungen, Lagern und Wellen", 1981, p. 150-p. 151.

XP000542536, Papkala H: "An Investigation into the Processes of Projection Welding of Galvanised Sheet", vol. 10, No. 1, Jan. 1996, pp. 5-13.

* cited by examiner

*Primary Examiner*—Faye M. Fleming
(74) *Attorney, Agent, or Firm*—Rankin, Hill, Porter & Clark LLP

(57) ABSTRACT

A mounting bracket 11 formed of a material having a thickness which permits no resistance welding relative to the thickness of a plate constituting a vehicle body frame 10, having a mounting portion 28 which is so thick as not to be welded to the vehicle body frame 10 through resistance welding and on which components to be mounted 13, 14 are mounted, and being provided with a welding portion 33, adapted to be welded to the vehicle body frame 10, which is formed into a thickness which is thinner than the mounting portion 28 and which permits a resistance welding relative to the thickness of the plate which constitutes the vehicle body frame 10.

21 Claims, 6 Drawing Sheets

13
14
10
11

FIG. 6A
11A
FIG. 6B
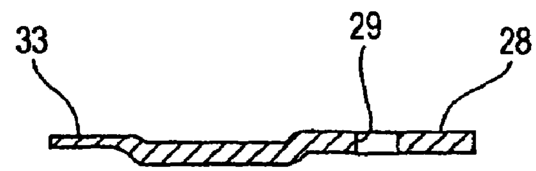
FIG. 6C
FIG. 6D
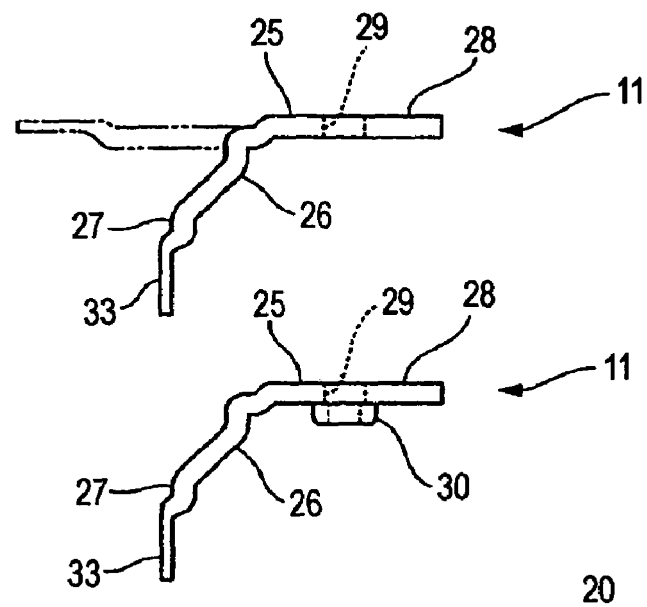
FIG. 6E
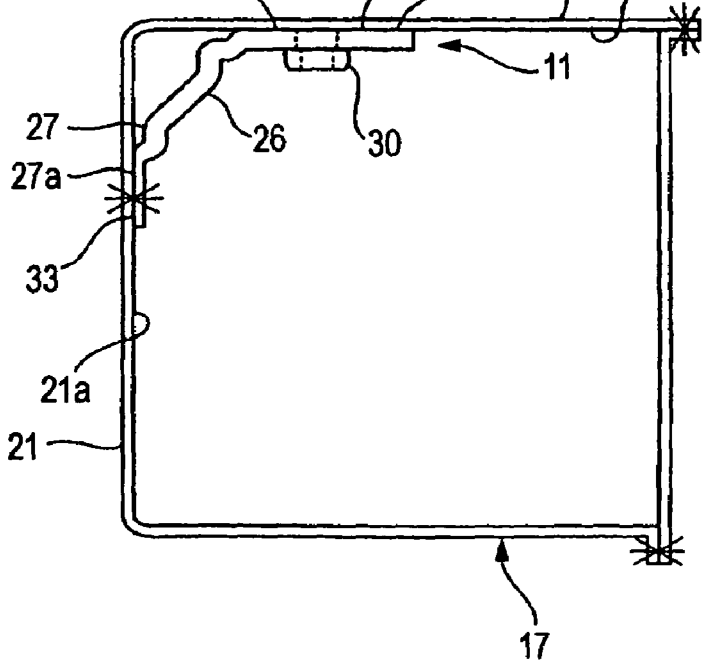

MOUNTING BRACKET

The present invention claims foreign priority to Japanese patent application no. 2003-429205, filed on Dec. 25, 2003, the contents of which is incorporated herein by reference.

BACKGROUND OF THE INVENTION

1. Field of the Invention

The present invention relates to a mounting bracket for use in supporting a component to be mounted on a body frame of a vehicle.

2. Description of the Related Art

A technique regarding a mounting bracket for use in supporting an engine on a body frame of a vehicle is disclosed in, for example, Japanese Patent Unexamined Publication JP-A-5-97059.

As a whole, the mounting bracket of this type is formed thick, including a mounting portion on which a component to be mounted is mounted, as the component tends to be heavy. With the thick mounting bracket, a difference in thickness between the mounting bracket itself and a plate material constituting the vehicle body frame is too big, and therefore, the thick mounting bracket cannot be secured to the vehicle body frame using resistance welding. Due to this, MIG (metal inert gas) welding is normally used to secure manually the mounting bracket to the vehicle body frame.

When attempting to weld the mounting bracket to the vehicle body frame using the MIG welding as described above, however, the welding cost is increased by the adoption of the MIG welding, and the labor cost is also increased due to the manual operation that is inherent in the MIG welding.

SUMMARY OF THE INVENTION

Consequently, an object of the present invention is to provide a mounting bracket which can be welded to the vehicle body frame at low cost.

With a view to attaining the solution, according to a first aspect of the present invention, there is provided a mounting bracket comprising:

an mounting portion mounting a component to be mounted and a welding portion welded to a vehicle body frame, wherein the mounting portion having a thickness which is unable to be welded to the vehicle body frame by resistance welding and the welding portion having a thickness which is able to be welded to the vehicle body frame by resistance welding.

According to a second aspect of the present invention as set forth in the first aspect of the present invention, it is preferable that the welding portions are formed on each of two surfaces of the mounting bracket, relatively, the surfaces of the mounting bracket are welded to surfaces of the vehicle body frame which form a corner portion thereof, the mounting bracket is welded to be secured to the vehicle body frame at the welding portions so formed on the two surfaces thereof.

According to a third aspect of the present invention as set forth in the second aspect of the present invention, it is preferable that a gap is formed between the corner portion and the mounting bracket.

According to a fourth aspect of the present invention as set forth in the second aspect of the present invention, it is preferable that the two surfaces of the mounting bracket are formed by pressing.

According to a fifth aspect of the present invention as set forth in the first aspect of the present invention, it is preferable that the welding portion is formed at a plurality of scattering locations.

According to a sixth aspect of the present invention as set forth in the first aspect of the present invention, it is preferable that the welding portion is formed by forging.

According to a seventh aspect of the present invention as set forth in the first aspect of the present invention, it is preferable that the mounting bracket is formed of a material having a thickness which is unable to be welded to the vehicle body frame by resistance welding.

According to an eighth aspect of the present invention as set forth in the first aspect of the present invention, it is preferable that the component to be mounted is a mounting bracket for an engine.

According to a ninth aspect of the present invention as set forth in the first aspect of the present invention, it is preferable that the component to be mounted is a mounting bracket for a lower arm of a suspension member.

According to a tenth aspect of the present invention as set forth in the first aspect of the present invention, it is preferable that the component to be mounted is a mounting bracket for a transmission.

According to an eleventh aspect of the present invention as set forth in the first aspect of the present invention, it is preferable that the mounting bracket further comprising a base plate portion, wherein the welding portion and the mounting portion are protruded from the base plate portion towards a vehicle body frame side.

According to a twelfth aspect of the present invention as set forth in the eleventh aspect of the present invention, it is preferable that a protruded surface of the welding portion is flush with a protruded surface of the mounting portion.

According to a thirteenth aspect of the present invention as set forth in the first aspect of the present invention, it is preferable that the mounting bracket further comprising:

a nut member provided on a lower surface of the mounting portion, wherein through holes are formed co-axially on the mounting portion, the vehicle body frame and the component to be mounted, a bolt member passes through the through holes and fixes to the nut member to thereby mount the component to be mounted to the vehicle body frame.

According to a fourteenth aspect of the present invention as set forth in the thirteenth aspect of the present invention, it is preferable that the nut member is welded to the lower surface of the mounting portion.

According to a fifteenth aspect of the present invention as set forth in the thirteenth aspect of the present invention, it is preferable that the nut member is formed integrally with the mounting portion, and is formed by applying a hole making process.

According to a sixteenth aspect of the present invention as set forth in the first aspect of the present invention, it is preferable that the vehicle body frame includes:

an U-shaped member having an opening in a horizontal direction; and a flat plate member disposed so as to close the opening of the U-shaped member, wherein the welding portions of the mounting bracket are welded to an upper portion and a side plate portion of the U-shaped member, respectively.

According to a seventeenth aspect of the present invention as set forth in the first aspect of the present invention, it is preferable that the mounting bracket further comprising:

an upper plate portion; and a first side plate portion disposed to be vertical relative to the upper plate portion, wherein the welding portions are provided on the upper plate portion and the first side plate portion, respectively.

According to an eighteenth aspect of the present invention as set forth in the seventeenth aspect of the present invention, it is preferable that the mounting bracket further comprising:

a first inclined plate portion which connects with the upper plate portion and the first side plate portion, wherein an angle between the first inclined plate portion and the upper, and an angle between the first inclined plate portion and the side plate portion are obtuse.

According to a nineteenth aspect of the present invention as set forth in the seventeenth aspect of the present invention, it is preferable that the mounting bracket further comprising:

a second side plate portion disposed to be vertical relative to the upper plate portion, a second inclined plate portion connecting the upper plate portion to the second side plate portion, wherein an angle between the second inclined plate portion and the upper plate portion and an angle between the second inclined plate portion and the side plate portion are obtuse, and the welding portion provided on the second side plate is welded to the flat plate portion of the vehicle body frame.

According to a twentieth aspect of the present invention as set forth in the first aspect of the present invention, it is preferable that the mounting bracket further comprising:

an upper plate portion; and first and second side plate portion disposed to be vertical relative to the upper plate portion, wherein the vehicle body frame is formed U-shaped having an opening in an upper direction thereof, and the welding portions provided on the first and second side plate portions are welded to side plate portions of the vehicle body frame so as to close the opening of the vehicle body frame.

Note that the thickness which is unable to be welded to the vehicle body frame by resistance welding is thicker than the thickness of the component to be mounted three times or more.

According to the first aspect of the present invention, even in the event that the mounting bracket is formed of the material having a thickness which permits no resistance welding relative to the thickness of the plate which constitutes the vehicle body frame and has the mounting portions which are so thick as not to be welded to the vehicle body frame through resistance welding and on which the component to be mounted thereon is mounted, since the welding portions, which are adapted to be welded to the vehicle body frame, are formed into the thickness which is thinner than the mounting portions and which permits the resistance welding relative to the thickness of the plate which constitutes the vehicle body frame, the mounting bracket can be secured to the vehicle body frame through resistance welding. Consequently, since the rigidity and weight of the mounting bracket can be made high and heavy, even when used for mounting a vibrating component such as an engine and a transmission on the vehicle body, the mounting bracket exhibits a damping effect and requires less reinforcement. Moreover, when compared with the case where the MIG welding is used, the welding cost can be reduced, and since automation can be facilitated, the human workforce-related cost can also be reduced.

According to the second aspect of the present invention, since the welding portion is formed on each of the two surfaces of the mounting bracket which are joined, relatively, to the two surfaces of the vehicle body frame which form the corner portion therebetween, whereby the mounting bracket is welded to be secured to the two surfaces of the vehicle body frame which form the corner portion therebetween at the welding portions so formed on the two surfaces thereof, the required strength and rigidity can be secured even by the mounting bracket, which can be formed small in size.

According to the third aspect of the present invention, since the gap is formed between the corner portion and the mounting bracket so welded, electrodeposition liquid is allowed to flow smoothly in an electrodeposition painting process, and since a closed cross section is formed by the vehicle body frame and the mounting bracket so welded, the strength can be increased. Furthermore, since the mounting bracket is shaped so as to form the gap between the corner portion and itself, when bent in the shaping process, the mounting bracket does not have to be bent at a large bending angle, and hence, the bending process is made easy.

According to the fourth aspect of the present invention, since the two surfaces of the mounting bracket which are joined to the two surfaces of the vehicle body frame which form the corner portion therebetween are formed by pressing, the two surfaces can be formed easily, and automation can further be facilitated.

According to the fifth aspect of the present invention, since the welding portions are formed at the plurality of scattering locations, the thickness which permits no resistance welding continues to the adjacent welding portions, so that the thick portions other than the welding portions continue to one another via the adjacent welding portions, the strength and rigidity can further be increased.

According to the sixth aspect of the present invention, the thin welding portions can easily be formed on the thick material through forging.

BRIEF DESCRIPTION OF THE DRAWINGS

FIG. 6A though 6E are showing a fabricating process of the mounting bracket according to the embodiment of the present invention;

DETAILED DESCRIPTION OF THE PREFERRED EMBODIMENTS

A mounting bracket according to an embodiment of the present invention will be described below by reference to the accompanying drawings.

FIGS. 1 to 4 show a front frame 10 i.e. a vehicle body frame, formed into a shape having a closed cross section and provided at a front part of the vehicle body in such a manner as to extend longitudinally and the periphery of the front frame 10. A mounting bracket 11 is disposed inside the front frame 10. This mounting bracket 11 is designed to allow an engine as a component to be mounted to be supported on the front frame 10 via an engine mount bracket 13 as a component to be mounted.

Figure 1:
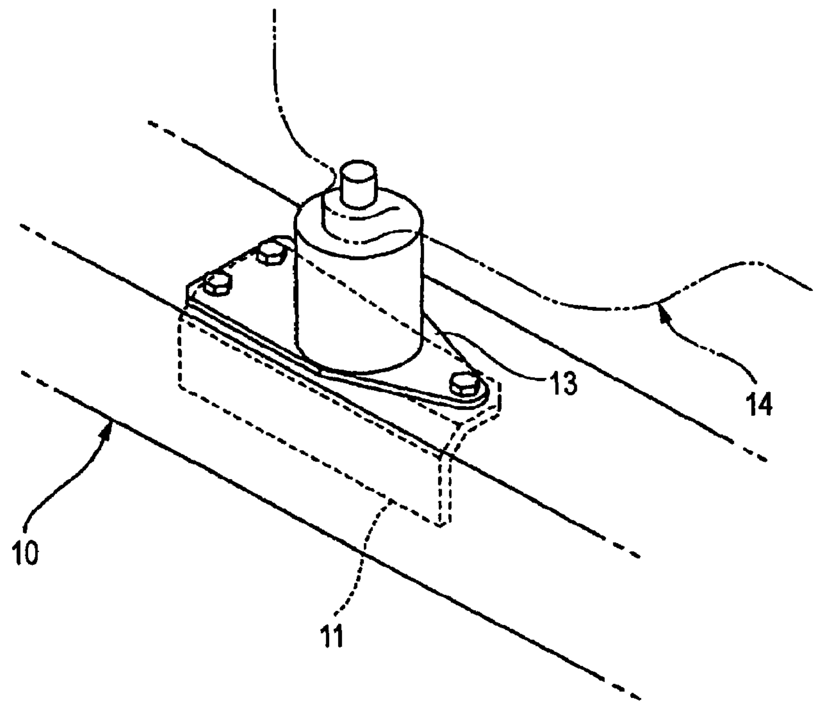
FIG. 1 is a partial perspective view showing a front frame in which a mounting bracket according to an embodiment of the present invention is provided and the periphery of the mounting bracket so provided.
Figure 2:
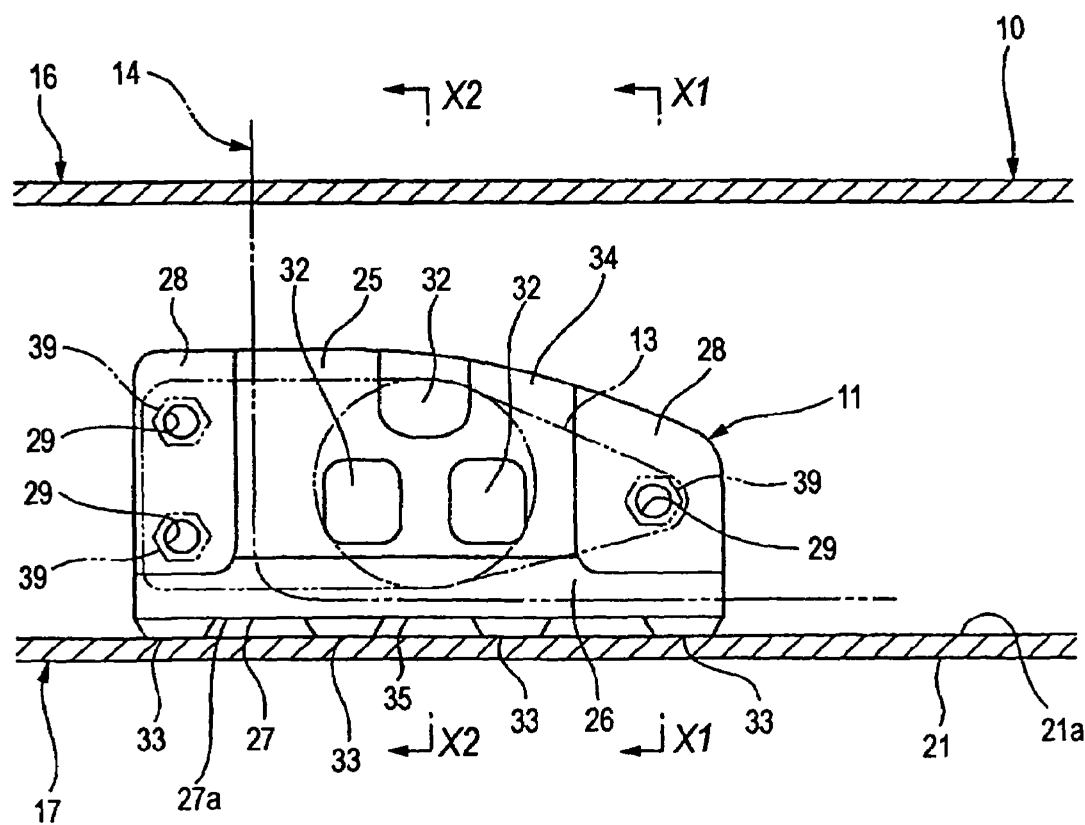
FIG. 2 is a partially sectional plan view of the front frame in which the mounting bracket according to the embodiment of the present invention is provided and the periphery of the mounting bracket so provided.
Figure 3:
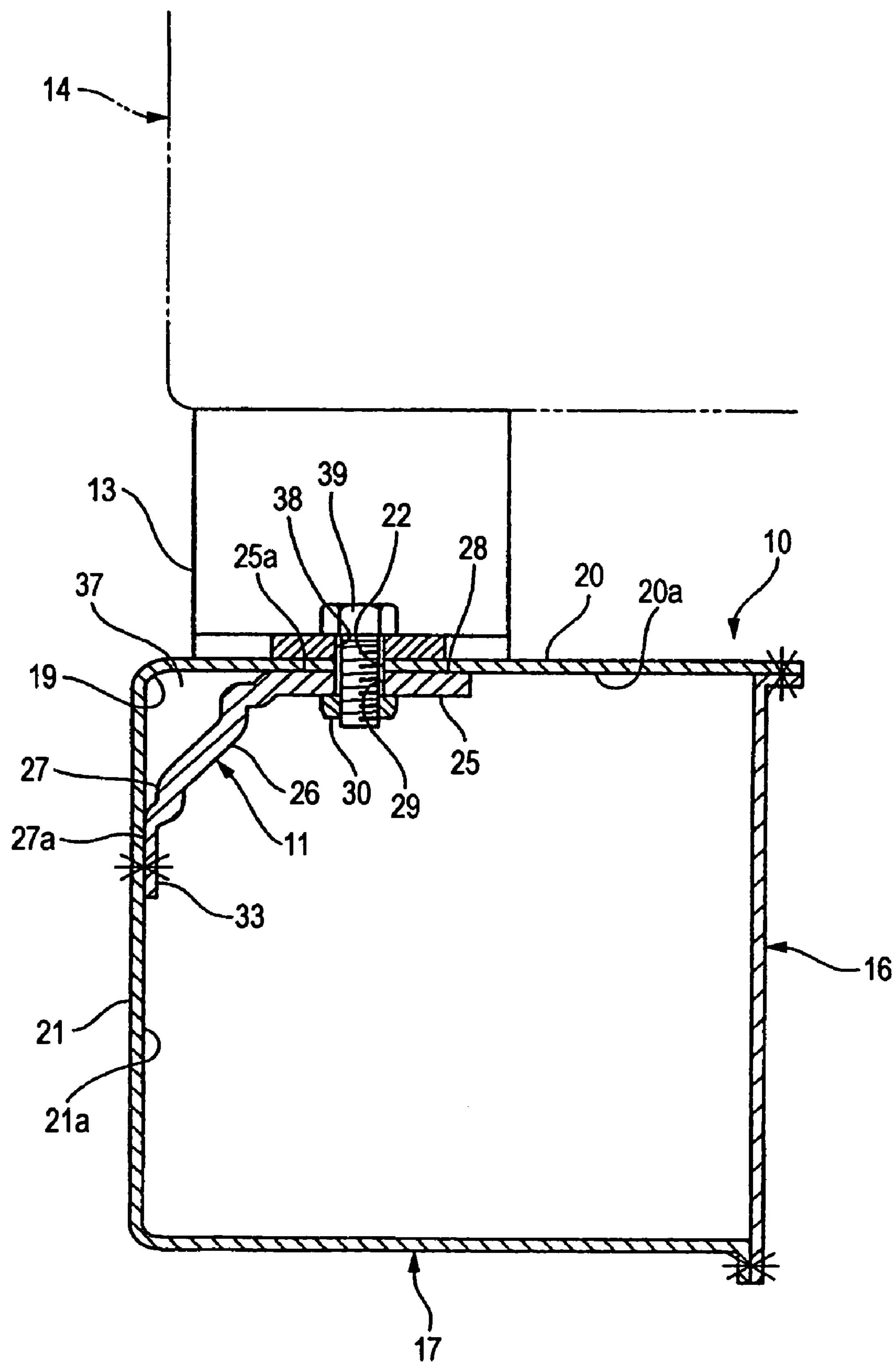
FIG. 3 is a front cross-sectional view of the front frame taken along the line X1—X1 in FIG. 2, which shows a portion of the front frame in which the mounting bracket according to the embodiment of the present invention is provided and the periphery of the mounting bracket so provided.
Figure 4:
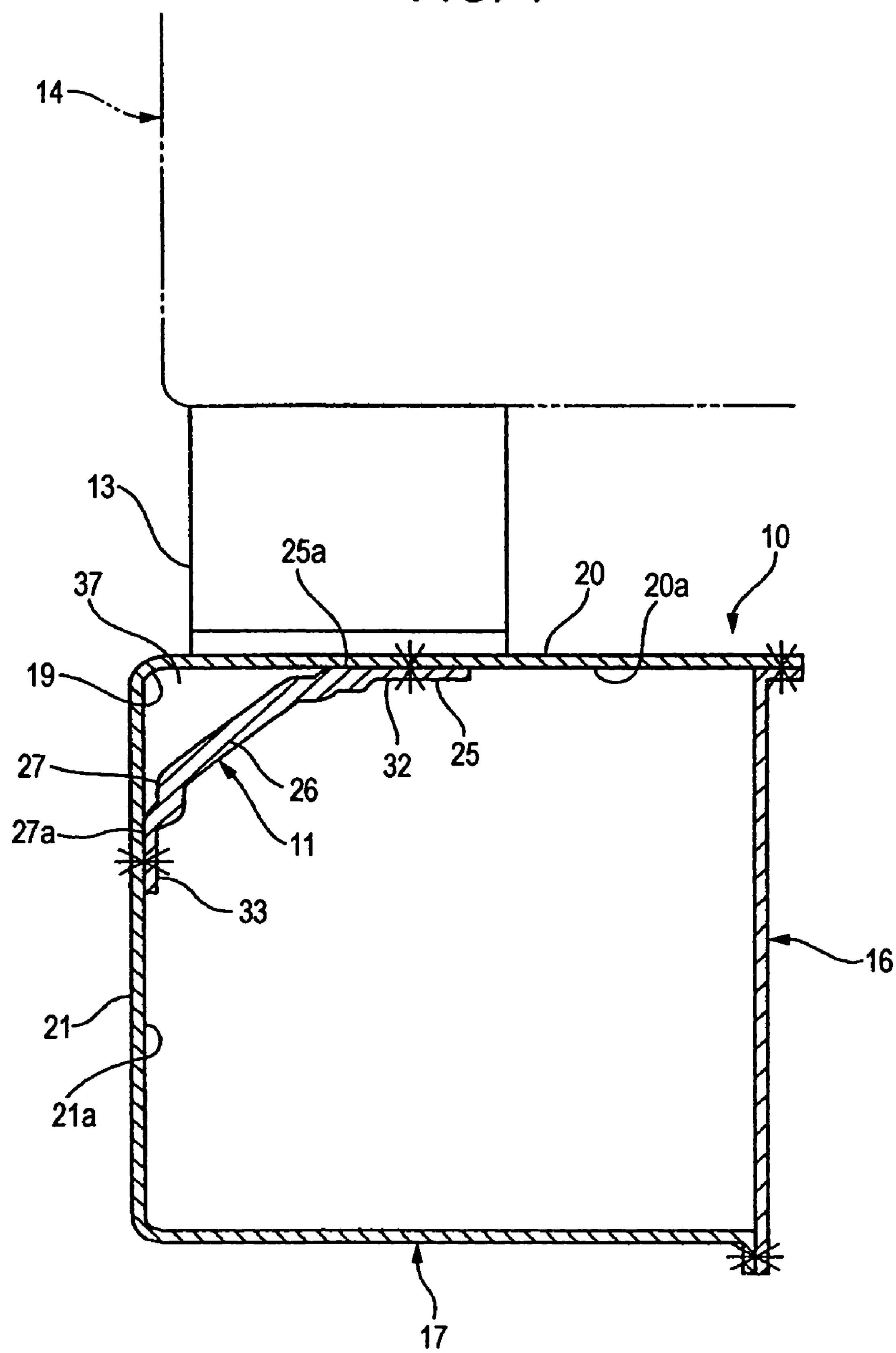
FIG. 4 is a front cross-sectional view of the front frame taken along the line X2—X2 in FIG. 2, which shows a portion of the front frame in which the mounting bracket according to the embodiment of the present invention is provided and the periphery of the mounting bracket so provided.

A portion of the front frame 10 on which the mounting bracket 11 is disposed is, as shown in FIGS. 3 and 4, substantially flat plate-like shape. Further, the portion is formed substantially U-shaped cross section with a frame member 16 which extend in a vertical direction. Furthermore, at an end portion, the portion is formed as a closed cross section with a frame member 16 which is welded to the frame member 17. The mounting bracket 11 is mounted in such a manner as to straddle the corner portion 19 over an upper plate portion 20 and a side plate portion 21. Where, the upper plate portion 20 and the side plate portion 21 constitute a corner portion 19 of the frame member 17 which is provided opposite side of the frame member 16 side and upper side. Note that through holes are vertically formed at predetermined positions in the upper plate portion 20 for mounting the engine mount bracket 13 thereon.

Figure 5:
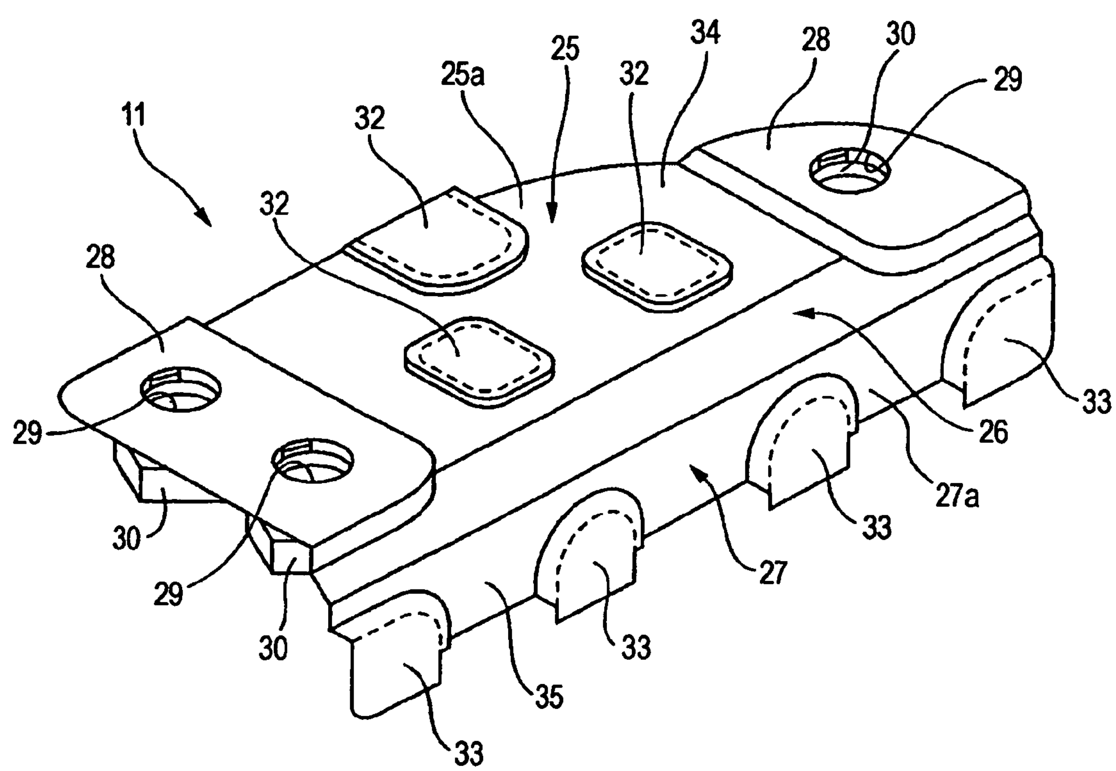
FIG. 5 is a perspective view of the mounting bracket according to the embodiment of the present invention.

As shown in FIG. 5, the mounting bracket 11 has an upper plate portion 25, a sloping plate portion 26 which extends downwardly from one side of the upper plate portion 25 and a side plate portion 27 which extends downwardly from a side, which is opposite to the upper plate portion 25, of the sloping plate portion 26 in a direction which intersects with the upper plate portion 25 at right angles. The sloping plate portion 26 forms an obtuse angle relative to the upper plate portion 25 and the side plate portion 27.

A step-like mounting portion 28 is formed at each end of the upper plate portion 25 in such a manner as to be raised higher than the remaining portion thereof. Also, a vertically extending through hole 29 is formed in each mounting portion 28. Here, note that a nut 30 is disposed and fixed through welding to a lower surface of each mounting portion 28 in such a manner as to be coaxial with the through hole 29.

Welding portions 32, which are to be welded to the front frame 10, are formed at a plurality of or, specifically speaking, three scattering locations on the portion of the upper plate portion 25 which extends between the two mounting portions 28 thereof. Also, a welding portions 33, which are to be welded to the front frame 10, are also formed at a plurality of or, specifically speaking, four scattering locations on the side plate portion 27. Note that a flat portion of the upper plate portion 25 which excludes the mounting portions 28 and all the welding portions 32 is referred to as a base plate portion 34, and a flat portion of the side plate portion 27 which excludes all the welding portions 33 is referred to as a base plate portion 35.

The welding portions 32 formed on the upper plate portion 25 are raised higher by a step than the base plate portion 34 so as to be level with the mounting portions 28. In addition, the welding portions 33 formed on the side plate portion 27 are also raised higher by a step than the base plate portion 35 in an opposite direction to a direction in which the upper plate portion 25 extends. Here, note that the entire remaining portion of the mounting bracket 11 which excludes the welding portions 32, 33, that is, the mounting portions 28 and the base plate portion 34 of the upper plate portion 25, the sloping plate portion 26 and the base plate portion 35 of the side plate portion 27 are formed substantially into the same thickness. The thickness is thicker than that of the welding portions 32, 33. Whereas all the welding portions 32, 33 are formed substantially into the same thickness, which is thinner than the entire remaining portion of the mounting bracket 11 which excludes the welding portions 32, 33. Here, the mounting portions 28 and the base plate portions 34, 35, which are both made thicker, are too thick to be resistance welded which is also called spot welded to the upper plate portion 20 and the side plate portion 21 of the frame member 17 of the front frame 10, whereas the welding portions 32, 33, which are made thinner, are made substantially as thick as the upper plate portion 20 and the side plate portion 21 of the frame member 17 of the front frame 10 so as to be spot welded thereto.

The mounting bracket 11, which is formed into the shape that has been described heretofore, is formed as will be described below.

As shown in FIG. 6A, a material 11A is prepared which is formed into a flat plate-like shape and which has a thickness which permits no resistance welding relative to the thickness of the upper plate portion 20 and the side plate portion 21 of the frame member 17 of the front frame 10. Further, the material has a thickness which is thick enough to support the engine 14, which is a heavy component. Then, as shown in FIG. 6B, through forging, all the welding portions 32, 33 are formed thinner at predetermined positions on the material 11A, here, only the welding portion 33 is shown in FIG. 6B, while the mounting portions 28 and the other portions are formed thicker. Next, the through holes 29 are formed with a drill at predetermined positions in the material 11A after forging has been completed. Next, as shown in FIG. 6C, the upper plate portion 25, the sloping plate portion 26 and the side plate portion 27 are formed by performing a bending process through pressing. Then, as shown in FIG. 6D, the nut 30 is welded to be secured to the lower side of the mounting portion 28 so as to align with the position of each through hole 29.

Note that the separate nut 30 and welding thereof can be omitted by forming a protruding portion at a position where the through hole 29 is to be formed while the material 11A is being forged and applying a hole making process and a threading process to the protruding portion so formed through forging.

Thus, the mounting bracket 11 is provided which is formed of the material 11A having the thickness which permits no resistance welding to the front frame 10. The mounting bracket 11 has the mounting portions 28 which have the thickness which permits no resistance welding to the front frame 10 and on which the engine mount bracket 13 and the engine 14, which are both components to be mounted, are mounted and is provided with the welding portions 32, 33, adapted to be welded to the front frame 10, which are forged so as to have the thickness which is thinner than the mounting portions 28 and which permits resistance welding to the front frame 10.

Then, in the mounting bracket 11, which is formed as has been described above, the welding portions 32, 33 are formed, respectively, on two surfaces constituted by an upper surface 25*a* of the upper plate portion 25 and an outer surface 27*a* of the side plate portion 27. Accordingly, as shown in FIGS. 6E and 4, the mounting bracket 11 is welded to be secured to two surfaces constituted by a lower surface 20*a* of the upper plate portion 20 and an inner surface 21*a* of the side plate portion 21 which form the corner portion 19 of the frame member 17 of the front frame 10 therebetween at the welding portions 32, 33 on the upper surface 25*a* and the outer surface 27*a*. Namely, as shown in FIGS. 3 and 4, all the welding portions 32 on the upper plate portion 25 of the mounting bracket 11 are spot welded to the upper plate portion 20 of the frame member 17 in a state where the through holes 29 and the nuts 30 on the upper plate portion 25 are aligned with through holes 22 in the upper plate portion 20 of the front frame 10. Also, the welding portions 32 and the mounting portions 28 on the upper plate portion 25 are in abutment with the lower surface 20*a* of the upper plate portion 20 of the frame member 17. Accordingly the mounting portions 28 are joined to the upper plate portion 20 of the frame member 17. In addition, in conjunction with this, the welding portions 33 on the side plate portion 27 of the mounting bracket 11 are spot welded to the side plate portion 21 of the frame member 17 in a state where the welding portions on the side plate portion 27 are in abutment with the inner surface 21*a* of the side plate portion 21 of the front frame 10. Here, since the sloping plate portion 26 is formed on the mounting bracket 11, a gap 37 is formed between the corner portion 19 of the frame member 17 and the mounting bracket 11 so welded.

Then, a fastening bolt 39 for mounting the engine mount bracket 13 is passed through a mounting hole 38 in the engine mount bracket 13 and the through hole 22 in the upper plate portion 20 of the front frame 10 from above so as to be fittingly screwed into the nut 30. Accordingly the engine mount bracket 13 is mounted on the front frame 10, so that the engine 14, which is a heavy component, is mounted, in turn, on the engine mount bracket 13.

According to the mounting bracket 11 according to the embodiment of the present invention, which has been described heretofore, even in the event that the mounting bracket 11 is formed of the material 11A having the thickness which permits no resistance welding relative to the thickness of the front frame member 10 and has the mounting portions 28 which are so thick as not to be welded to the front frame 10 through resistance welding and on which the engine mount bracket 13 and the engine 14 are mounted, since the welding portions 32, 33, which are adapted to be welded to the front frame 10, are formed into the thickness which is thinner than the mounting portions 28 and which permits the resistance welding relative to the thickness of the front frame 10, the mounting bracket 11 can be secured to the front frame 10 through resistance welding. Consequently, since the rigidity and weight of the mounting bracket 11 can be made high and heavy, even when used for mounting a vibrating component such as the engine and the transmission on the vehicle body, the mounting bracket 11 exhibits a damping effect and requires less reinforcement. Moreover, when compared with the case where the MIG welding is used, the welding cost can be reduced, and since automation can be facilitated, the human workforce-related cost can also be reduced.

In addition, since the welding portions 32, 33 are formed, respectively, on the two surfaces constituted by the upper surface 25*a* of the upper plate portion 25 and the outer surface 27*a* of the side plate portion 27 which are joined to the two surfaces constituted by the lower surface 20*a* of the upper plate portion 20 and the inner surface 21*a* of the side plate portion 21 which form the corner portion 19 of the front frame 10, whereby the mounting bracket 11 is welded to be secured to the two surfaces constituted by the lower surface 20*a* of the upper plate portion 20 and the inner surface 21*a* of the side plate portion 21 which form the corner portion 19 of the front frame 10 at the welding portions 32, 33 on the upper surface 25*a* of the upper plate portion 25 and the outer surface 27*a* of the side plate portion 27, the required strength and rigidity can be secured even by the mounting bracket, which can be formed small in size.

Furthermore, since the gap 37 is formed between the corner portion 19 of the front frame 10 and the mounting bracket 11 so welded, electrodeposition liquid is allowed to flow smoothly in an electrodeposition painting process, and since the closed cross section is formed by the front frame 10 and the mounting bracket 11 so welded, the strength can be increased. Furthermore, since the mounting bracket 11 is shaped so as to form the gap 37 between the corner portion 19 and itself, when bent in the shaping process, the mounting bracket 11 does not have to be bent at a large bending angle, and hence, the bending process is made easy.

In addition, since the welding portions 32, 33 are formed at the plurality of scattering locations, the thickness which permits no resistance welding continues to the adjacent welding portions 32, 33, so that the base plate portion 34, the mounting portions 28, the sloping plate portion 26 and the base plate portion 35, which constitute the thick portions other than the welding portions 32, 33, are allowed to continue to one another via the adjacent welding portions 32, 33, the strength and rigidity of the mounting bracket 11 can further be increased.

Furthermore, since the two surfaces constituted by the upper surface 25*a* of the upper plate portion 25 and the outer surface 27*a* of the side plate portion 27 which are joined to the two surfaces constituted by the lower surface 20*a* of the upper plate portion 20 and the inner surface of the side plate portion 21 which form the corner portion 19 of the front frame 10 therebetween are formed by pressing, the two surfaces of the mounting plate 11 can be formed easily, and automation can further be facilitated.

In addition, the thin welding portions 32, 33 can easily be formed on the thick material 11A through forging.

Note that the mounting bracket is not limited to the embodiment that has been described heretofore, but a various modifications can be made thereto.

Figure 7:
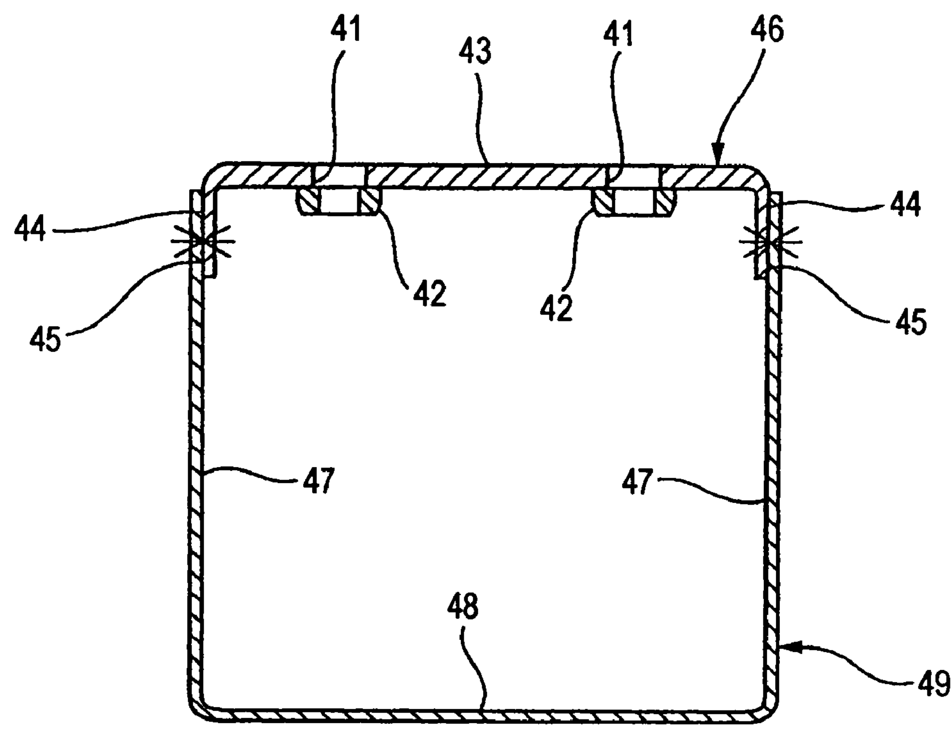
FIG. 7 is a front cross-sectional view of the front frame in which a mounting bracket according to another embodiment of the present invention is provided and the periphery of the mounting bracket so provided and FIG. 8 is a front cross-sectional view of the front frame in which a mounting bracket according to a further embodiment of the present invention is provided and the periphery of the mounting bracket so provided.

For example, as shown in FIG. 7, using a mounting bracket 46 in which an upper plate portion 43, i.e. a mounting portion, in which through holes 41 are formed and to which engine mount bracket mounting nuts 42 are welded on a lower surface thereof is made thick and thin welding portions 45 are forged on side plate portions 44 which extend downwardly, respectively, from both side edge portions of the upper plate portion 43, an upper opening in an upwardly opened frame member 49 having two side plate portions 47 and a lower plate portion 48 may be closed by welding the welding portions 45 of the side plate portions 44 to the side plate portions 47, respectively. In this case, there is provided an advantage that the number of components can be reduced.

Figure 8:
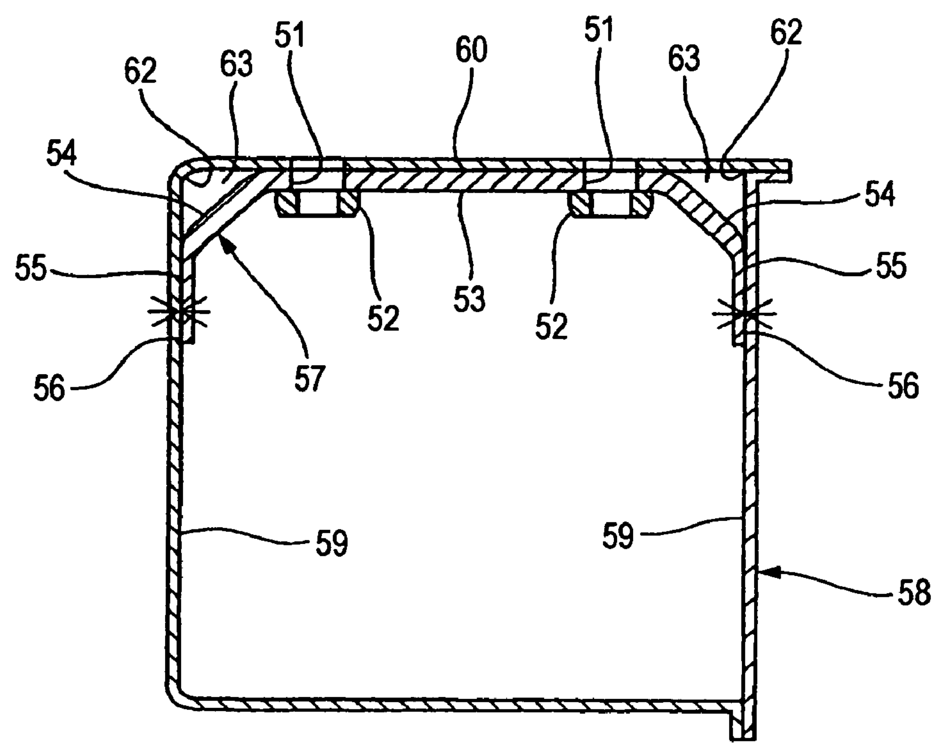

In addition, as shown in FIG. 8, using a mounting bracket 57 in which an upper plate portion 53, i.e. a mounting portion, in which through holes 51 are formed and to which engine mount bracket mounting nuts 52 are welded on a lower surface thereof and sloping plate portions 54 which extend outwardly and obliquely downwardly from both side edge portions of the upper plate portion 53 are made thick and thin welding portions 56 are forged to be formed on side plate portions 55 which extend downwardly from outer side edge portions of the respective sloping plate portions 54 and the upper plate portion 53 i.e. welding portions on the upper plate portion 53 are omitted in FIG. 8, the welding portions 56 on the side plate portions 55 and the welding portions, not shown, on the upper plate portion 53 may be welded, respectively, to side plate portions 59 and an upper plate portion 60 of a frame 58 having a closed cross section. In this case, since closed cross-section structures are formed at upper side corner portions 62 of the frame 58 in such manner as to surround gaps 63 formed at the corner portions 62, there is provided an advantage that the strength can further be increased.

Furthermore, in addition to the application to the mounting bracket for mounting the engine 14 on the front frame 10 via the engine mount bracket 13, the mounting bracket can be used as amounting bracket for, for example, a lower arm, which is a suspension component, and a transmission.

Note that the thickness which is unable to be welded to the vehicle body frame by resistance welding is thicker than the thickness of the component to be mounted three times or more. For example, when a thickness of the component to be mounted is 1.5 mm, it is required the mounting bracket having a thickness of 5 mm. The thickness 5 mm is thicker than 4.5 mm which is three times thickness of the component to be mounted. However, it is impossible to perform resistance welding on the welding portion having such thickness 5 mm to weld to the vehicle body frame. Therefore, according to the present invention, only the welding portion is set to be 3.2–3.6 mm to enable to weld the mounting bracket to the vehicle body frame by resistance welding.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A mounting bracket for use in a vehicle comprising:

a base plate portion (34), a mounting portion (28) mounting a component (13, 14) to be mounted and a welding portion (32, 33) to be welded to a vehicle body frame (10), wherein the welding portion (32, 33) forms projections (32,33) protruding from the base plate portion (34) toward the vehicle body frame (10) when welded thereto, wherein a thickness of the projections (32, 33) is smaller than a thickness of the mounting portion (28).

2. The vehicle having the mounting bracket as set forth in claim 1, wherein the welding portions (32, 33) are formed on each of two surfaces of the mounting bracket (11), the surfaces of the mounting bracket (11) are welded to surfaces of the vehicle body frame (10), which form a corner portion (19, 62) thereof, the mounting bracket (11) is welded to be secured to the vehicle body frame (10) at the welding portions (32, 33) so formed on the two surfaces (25*a*, 27*a*) thereof.

3. The vehicle having the mounting bracket as set forth in claim 2, wherein a gap (37, 63) is formed between the corner portion (19, 62) and the mounting bracket (11).

4. The vehicle having the mounting bracket as set forth in claim 2, wherein the two surfaces (25*a*, 27*a*) of the mounting bracket (11) are formed by pressing.

5. The mounting bracket as set forth in claim 1, wherein the welding portion is formed at a plurality of scattering locations.

6. The mounting bracket as set forth in claim 1, wherein the welding portion is formed by forging.

7. The mounting bracket as set forth in claim 1, wherein the mounting bracket is formed of a material having a thickness which is too large to be welded to the vehicle body frame by resistance welding.

8. The mounting bracket as set forth in claim 1, wherein the component to be mounted is a mounting bracket for an engine.

9. The mounting bracket as set forth in claim 1, wherein the component to be mounted is a mounting bracket for a lower arm of a suspension member.

10. The mounting bracket as set forth in claim 1, wherein the component to be mounted is a mounting bracket for a transmission.

11. The mounting bracket as set forth in claim 1, further comprising a base plate portion, wherein the welding portion and the mounting portion protrude from the base plate portion toward a vehicle body frame side.

12. The mounting bracket as set forth in claim 11, wherein a protruding surface of the welding portion is flush with a protruding surface of the mounting portion.

13. The mounting bracket as set forth in claim 1, further comprising:

a nut member provided on a lower surface of the mounting portion, wherein through holes are formed co-axially on the mounting portion, the vehicle body frame and the component to be mounted, a bolt member passes through the through holes and fixes to the nut member to thereby mount the component to be mounted to the vehicle body frame.

14. The mounting bracket as set forth in claim 13, wherein the nut member is welded to the lower surface of the mounting portion.

15. The mounting bracket as set forth in claim 13, wherein the nut member is formed integrally with the mounting portion, and is formed by applying a hole making process.

16. The mounting bracket as set forth in claim 1, wherein the vehicle body frame includes:

a U-shaped member having an opening in a horizontal direction; and a flat plate member disposed so as to close the opening of the U-shaped member, wherein the welding portions of the mounting bracket are welded to an upper portion and a side plate portion of the U-shaped member, respectively.

17. The mounting bracket as set forth in claim 1, further comprising:

an upper plate portion; and a first side plate portion disposed to be vertical relative to the upper plate portion, wherein the welding portions are provided on the upper plate portion and the first side plate portion, respectively.

18. The mounting bracket as set forth in claim 17, further comprising:

a first inclined plate portion which connects with the upper plate portion and the first side plate portion, wherein an angle between the first inclined plate portion and the upper plate portion, and an angle between the first inclined plate portion and the side plate portion are obtuse.

19. The mounting bracket as set forth in claim 17, further comprising:

a second side plate portion disposed to be vertical relative to the upper plate portion, a second inclined plate portion connecting the upper plate portion to the second side plate portion, wherein an angle between the second inclined plate portion and the upper plate portion and an angle between the second inclined plate portion and the side plate portion are obtuse, and the welding portion provided on the second side plate is welded to a flat plate portion of the vehicle body frame.

20. The mounting bracket as set forth in claim 1, further comprising:

an upper plate portion; and first and second side plate portion disposed to be vertical relative to the upper plate portion, wherein the vehicle body frame is formed U-shaped having an opening in an upper direction thereof, and the welding portions provided on the first and second side plate portions are welded to side plate portions of the vehicle body frame so as to close the opening of the vehicle body frame.

21. A method for forming and attaching a bracket to a vehicle frame, comprising the steps of:

providing a bracket blank that is formed from material having a large thickness;

forging a portion of the bracket blank material to form a bracket having a thin portion and a thick portion;

press-forming the thin portion to bend the thin portion;

welding a nut to the thick portion, and resistance welding the thin portion to the vehicle frame.

* * * * *